(12) United States Patent
Kim et al.

(10) Patent No.: US 12,069,394 B2
(45) Date of Patent: Aug. 20, 2024

(54) DEPTH MAP DETERMINATION METHOD AND ELECTRONIC DEVICE TO WHICH SAME METHOD IS APPLIED

(71) Applicant: Samsung Electronics Co., Ltd., Gyeonggi-do (KR)

(72) Inventors: Changgon Kim, Gyeonggi-do (KR); Jeongwon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 17/534,545

(22) Filed: Nov. 24, 2021

(65) Prior Publication Data

US 2022/0086309 A1    Mar. 17, 2022

Related U.S. Application Data

(63) Continuation of application No. PCT/KR2020/005513, filed on Apr. 27, 2020.

(30) Foreign Application Priority Data

Jun. 5, 2019 (KR) .................. 10-2019-0066424

(51) Int. Cl.
*H04N 5/222* (2006.01)
*H04N 5/232* (2006.01)
(Continued)

(52) U.S. Cl.
CPC ......... *H04N 5/2226* (2013.01); *H04N 23/633* (2023.01); *H04N 25/40* (2023.01)

(58) Field of Classification Search
CPC ..... H04N 5/2226; H04N 23/633; H04N 25/40
See application file for complete search history.

(56) References Cited

U.S. PATENT DOCUMENTS 6,545,714 B1 * 4/2003 Takada .................. G02B 13/18
  348/340
8,009,189 B2 * 8/2011 Ortyn ................ G01N 21/6458
  356/73

(Continued)

FOREIGN PATENT DOCUMENTS

KR    10-2011-0024966 A    3/2011
KR      10-1165810 B1      7/2012

OTHER PUBLICATIONS

Synthetic Depth-of-Field with a Single-Camera Mobile Phone, vol. 37, No. 4, Article 64.
Korean Notice of Allowance dated Oct. 10, 2023.

*Primary Examiner* — Zaihan Jiang
(74) *Attorney, Agent, or Firm* — Cha & Reiter, LLC

(57) ABSTRACT

According to certain embodiments, an electronic device includes a lens part, a driving circuit, an image sensor, a memory, and a processor. The processor may obtain a first image and a second image by using the first group pixels and the second group pixels, generate first correction candidate images based on the first image and the second PSF feature information, generate second correction candidate images based on the second image and the first PSF feature information, identify matching costs between the first correction candidate images and the second correction candidate images in a pixel basis, and determine a depth map corresponding to the matching costs between the first correction candidate images and the second correction candidate images. In addition, certain embodiments understood from the specification are possible.

20 Claims, 13 Drawing Sheets

(51) Int. Cl.
*H04N 5/341* (2011.01)
*H04N 23/63* (2023.01)
*H04N 25/40* (2023.01)

(56) References Cited

U.S. PATENT DOCUMENTS

| | | | |
|---|---|---|---|
| 9,264,606 B2 | 2/2016 | Ishihara | |
| 9,325,971 B2 | 4/2016 | Cogswell et al. | |
| 9,451,216 B2 | 9/2016 | Nobayashi | |
| 9,542,750 B2 | 1/2017 | Muninder et al. | |
| 9,600,889 B2 | 3/2017 | Boisson et al. | |
| 9,781,344 B2 | 10/2017 | Ishihara | |
| 9,888,177 B2 | 2/2018 | Yachi | |
| 9,967,453 B2 | 5/2018 | Kim et al. | |
| 10,255,689 B2 | 4/2019 | Lee et al. | |
| 2002/0097376 A1* | 7/2002 | Applegate | A61B 3/1015 351/205 |
| 2003/0133036 A1* | 7/2003 | Takada | G02B 13/04 348/362 |
| 2011/0285963 A1* | 11/2011 | Kurtz | H04N 9/3144 353/8 |
| 2011/0288824 A1* | 11/2011 | Bietry | G02B 7/028 703/2 |
| 2012/0062997 A1* | 3/2012 | Deng | G02B 27/0025 703/2 |
| 2013/0107360 A1* | 5/2013 | Kurtz | G02B 5/3083 359/708 |
| 2014/0002606 A1* | 1/2014 | Blayvas | H04N 23/675 348/46 |
| 2014/0063234 A1 | 3/2014 | Nobayashi | |
| 2014/0192166 A1 | 7/2014 | Cogswell et al. | |
| 2015/0092091 A1 | 4/2015 | Ishihara | |
| 2015/0170371 A1 | 6/2015 | Muninder et al. | |
| 2015/0178936 A1 | 6/2015 | Boisson et al. | |
| 2015/0319420 A1 | 11/2015 | Fettig et al. | |
| 2016/0219221 A1 | 7/2016 | Yachi | |
| 2016/0255334 A1 | 9/2016 | Wajs et al. | |
| 2017/0118399 A1 | 4/2017 | Kim et al. | |
| 2017/0243367 A1 | 8/2017 | Lee et al. | |
| 2017/0345176 A1* | 11/2017 | Choi | G06T 7/571 |
| 2019/0122378 A1* | 4/2019 | Aswin | G06T 7/20 |
| 2020/0090399 A1* | 3/2020 | Kalkbrenner | G02B 21/008 |
| 2022/0086309 A1* | 3/2022 | Kim | H04N 23/672 |

\* cited by examiner (a) Far (b) Near

DEPTH MAP DETERMINATION METHOD AND ELECTRONIC DEVICE TO WHICH SAME METHOD IS APPLIED

CROSS-REFERENCE TO RELATED APPLICATION

This application is a continuation application, claiming the benefit priority under § 365(c), of an International application No. PCT/KR2020/005513, filed on Apr. 27, 2020, which is based on and claims the benefit of a Korean patent application number 10-2019-0066424, filed on Jun. 5, 2019, in the Korean Intellectual Property Office, the disclosure of each of which is incorporated by reference herein in its entirety.

TECHNICAL FIELD

Embodiments disclosed herein relate to a technology for determining a depth map based on a multi-pixel image sensor.

BACKGROUND ART

An electronic device may apply an optical effect of blurring a peripheral region in an image obtained using a camera. The peripheral region can be a region other than a specified subject. For example, the electronic device may use a stereo camera. The electronic device can then determine a disparity of a region of interest (ROI) of a first image (e.g., a left image) and a second image (e.g., a right image). The electronic device may apply an optical effect (e.g., live focus, out focus, or Bokeh effect) to the first image and the second image or a composite image (of the first image and the second image) based on the determined disparity. The electronic device may include, for example, a 2PD (dual photo diode) structure camera (hereinafter referred to as a '2PD camera') in which two light receiving elements (e.g., photo diodes) for detecting a phase difference are included in each pixel when a mounting space is insufficient. The electronic device may generate a plurality of images in which a phase difference is caused according to a focus through one photographing using the 2PD camera, and apply the optical effect based on a disparity between the generated images.

SUMMARY

In a camera including a 2PD sensor, light that has passed through one lens is absorbed by two light receiving elements. For example, in the 2PD camera, blur features (e.g., point spread function (PSF)) of the first image may be different from blur features of the second image. As another example, the 2PD camera may have different blur features for each image height. Since the 2PD camera has a short baseline, the disparity between the first image and the second image may be small. In addition, the 2PD camera may be sensitive to variations in the blur features because a plurality of images having different phase differences may be generated by one photographing and thus the signal-to-noise ratio is low. Such a problem may also occur in cameras including more than two light receiving elements (e.g., photo diodes) for detecting phase difference in each pixel.

Certain embodiments disclosed herein may provide a method for determining a depth map based on blur feature information of multiple pixels in an image sensor having a multi-pixel structure, and an electronic device to which the method is applied.

According to an embodiment disclosed herein, an electronic device comprises: at least one lens; an image sensor including first group of pixels receiving light that has passed through the at least one lens through a first optical path group and second group of pixels receiving the light that has passed through the at least one lens through a second optical path group; a memory configured to store first point spread function (PSF) feature information corresponding to the first group pixels and second PSF feature information corresponding to the second group pixels with respect to a plurality of focus positions of the at least one lens; and a processor operatively connected to the driving circuit, the image sensor, and the memory, wherein the processor is configured to: obtain a first image using the first group pixels and a second image using the second group pixels; generate first correction candidate images based on the first image and the second PSF feature information; generate second correction candidate images based on the second image and the first PSF feature information; and determine a depth map corresponding to matching costs between the first correction candidate images and the second correction candidate images.

According to certain embodiments, a method for determining a depth map in an electronic device comprises: obtaining a first image by using first group pixels receiving light that has passed through at least one lens, through a first optical path group and obtaining a second image by using second group pixels receiving the light that has passed through the at least one lens, through a second optical path group; obtaining first point spread function (PSF) feature information corresponding to the first group pixels and second PSF feature information corresponding to the second group pixels with respect to a plurality of focus positions; generating first correction candidate images based on the first image and the second PSF feature information and generating second correction candidate images based on the second image and the first PSF feature information; identifying matching costs between the first correction candidate images and the second correction candidate images in units of pixels; and determining a depth map corresponding to the matching costs between the first correction candidate images and the second correction candidate images.

According to certain embodiments disclosed herein, it is possible to determine a depth map based on blur feature information of multiple pixels in an image sensor having a multi-pixel structure.

In addition, various effects may be provided that are directly or indirectly understood through the disclosure.

DESCRIPTION OF DRAWINGS

In the description of the drawings, the same or similar reference numerals may be used for the same or similar components.

DETAILED DESCRIPTION

Figure 1:
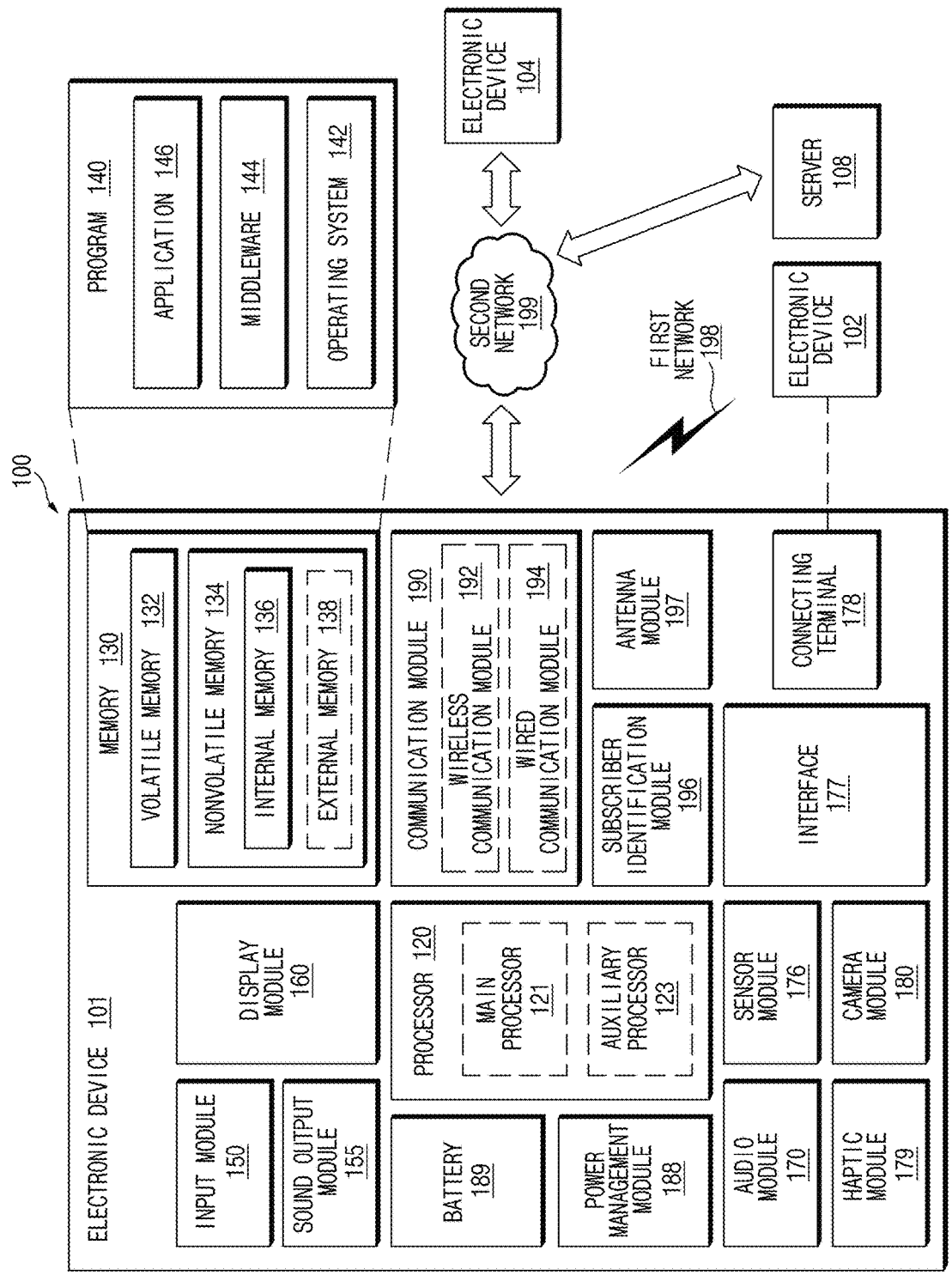
FIG. 1 illustrates a block diagram of an electronic device for generating a depth map in a network environment, according to certain embodiments.

FIG. 1 is a block diagram of an electronic device 101 that includes a camera module 180. In certain embodiments, the camera module 180 may include an image sensor with 2PD sensors. When the image sensor includes 2PD sensors, each pixel is associated with two photodiodes. Associating each pixel with two photodiodes allows absorbance of more light. The two photodiodes also allow for generating a two images, the two images having a phase difference. The phase difference can be used to apply an optical effect of blurring a peripheral region.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Figure 2:
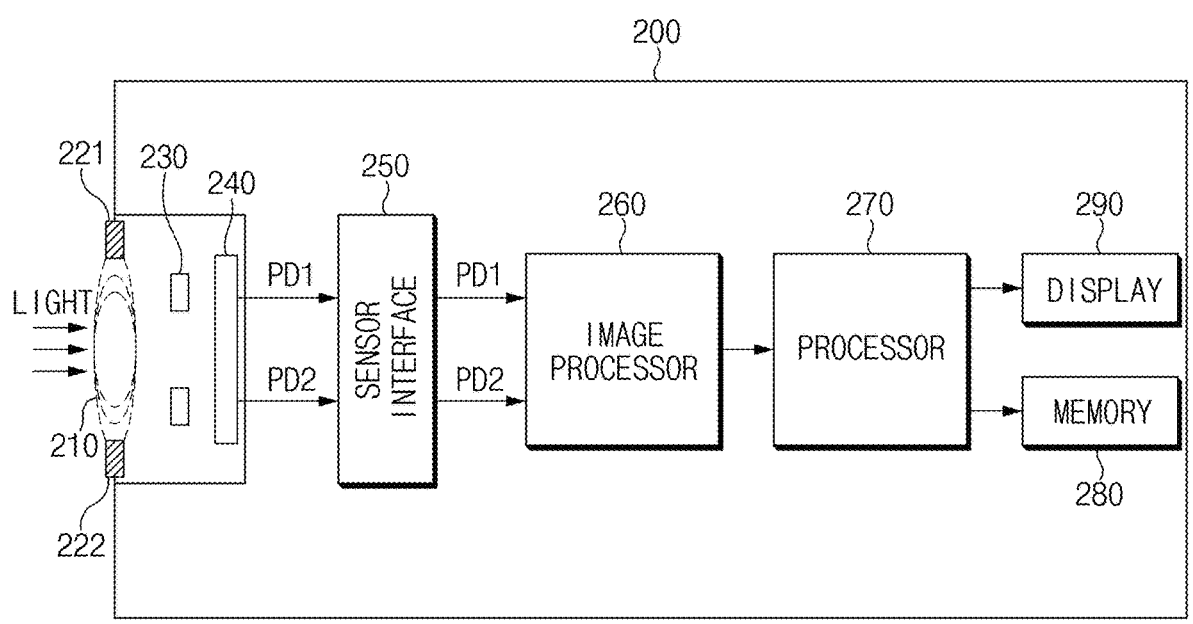
FIG. 2 illustrates a configuration diagram of an electronic device according to an embodiment.

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. FIG. 2 illustrates a configuration diagram of an electronic device according to an embodiment. The electronic device 200 includes an image sensor 240. The image sensor 240 includes a pixel array. Each pixel in the pixel array is associated with two photodiodes. Alternatively, first group pixels can be associated with the first ones of the two photodiodes while second group pixels can be associated with the second ones of the two photodiodes. Accordingly, the first group pixels of the image sensor 240 provide a first picture PD1 and the second group pixels of the image sensor 240 provides a second picture PD2. The first picture PD1 and the second picture PD2 can have a phase difference.

The image processor 260 may generate a first correction candidate image for the first image using a second PSF feature information of the second group pixels and a second correction candidate image for the second image using a first PSFT feature information of the first group pixels. Memory 280 can include first PSF feature information including asymmetric blur features and the image height-specific blur features of the first group pixels. Memory 280 can also include second PSF feature of the second group pixels.

Referring to FIG. 2, an electronic device 200 (e.g., a camera) according to an embodiment may collect light reflected from a subject to capture a picture or a video. The electronic device 200 may include a lens part 210, an aperture 230, a first driving circuit 221, a second driving circuit 222, an image sensor 240, a sensor interface 250, an image processor 260, a processor 270, a memory 280, and a display 290. According to certain embodiments, in the electronic device 200, the lens part 210, the aperture 230, the first driving circuit 221, the second driving circuit 222, the image sensor 240, and the sensor interface 250 may constitute a camera (e.g., the camera module 180 of FIG. 1), and the image processor 260 and the processor 270 may constitute at least one processor (e.g., the processor 120 of FIG. 1).

The lens part 210 may collect light that is reflected from a subject and reaches the electronic device 200. The collected light may reach the image sensor 240 through the aperture 230.

The aperture 230 may adjust the amount of light (light amount) reaching the image sensor 240 under the control of the image processor 260. For example, as the aperture 230 is tightened (or the aperture value is larger), the amount of light reaching the image sensor 240 decreases, and as the aperture 230 is opened (or the aperture value is smaller), the amount of light reaching the image sensor 240 may increase.

The first driving circuit 221 may move the lens part 210 in a direction close to or spaced apart from a subject along an optical axis under the control of the image processor 260. Through this, the electronic device 200 may automatically adjust a focus on the subject.

The second driving circuit 222 may dynamically adjust a position of the lens part 210 or the image sensor 240 under the control of the image processor 260. For example, the second driving circuit 222 may finely adjust the placement of the lens part 210 or the image sensor 240 in a direction opposite to the shaking direction of the user's hand holding the electronic device 200 (e.g., a direction perpendicular to the optical axis). Through this, the electronic device 200 may correct image shake due to hand shaking.

The image sensor 240 may include a pixel array in which a plurality of pixels is two-dimensionally arranged in a grid shape. One of a plurality of reference colors may be allocated to each of the pixels. According to certain embodiments, the plurality of reference colors may include, for example, RGB (red, green, blue), RGBW (red, green, blue, white), RYB (red, yellow, blue), RGBIR (infrared ray). The plurality of pixels may include first group pixels and second group pixels. For example, the first group pixels may receive light through a first optical path group. The second group pixels may receive light through a second optical path group.

A micro lens for inducing light that has passed through the lens part 210 and the aperture 230 to the plurality of pixels may be disposed on the plurality of pixels. For example, the micro lens may induce light that has passed through the first optical path group (or the second optical path group) to reach at least one of the first group pixels (or second group pixels). Hereinafter, for convenience of description, the first group pixels and the second group pixels covered by one micro lens are referred to as first group pixels and second group pixels belonging to the same channel.

The image sensor 240 may generate an electrical signal based on light reflected from a subject, and generate digital image data based on the electrical signal. The image sensor 240 may generate first image data (hereinafter, referred to as a 'first image') of the subject based on the first group pixels, and generate second image data (hereinafter, referred to as a 'second image') based on the second group pixels.

The sensor interface 250 may perform an interface between the image sensor 240 and the image processor 260. Depending on the configuration of the electronic device 200, the sensor interface 250 may be included in the image processor 260.

The image processor 260 may perform various processing on the first image and the second image output from the image sensor 240, and display a result of the performance on the display 290 or store the result in the memory 280. For example, the image processor 260 may obtain the first image (e.g., a left image) using the first group pixels, and obtain the second image (e.g., a right image) having a phase difference from the first image using the second group pixels.

The image processor 260 may generate a first correction candidate image for the first image and a second correction candidate image for the second image, by using asymmetric blur features and image height-specific blur features. For example, the image processor 260 may correct each correction candidate image more accurately by generating a plurality of first correction candidate images and a plurality of second correction candidate images based on the asymmetric blur features and the image height-specific blur features. In this regard, a built-in memory (or the memory 280) of the image processor 260 may store pieces of first PSF feature information and pieces of second PSF feature information including the asymmetric blur features and the image height-specific blur features of the first group pixels and the second group pixels according to the focus positions of the lens part 210. The image processor 260 may generate the first correction candidate images by using the asymmetric blur features and the image height-specific blur features of the first image. Also, the image processor 260 may generate the second correction candidate images by using the asymmetric blur features and the image height-specific blur features of the second image. The image processor 260 may calculate matching costs between the first correction candidate images and the second correction candidate images for the same defocus position in a pixel basis. For example, the image processor 260 may obtain depth information of each pixel based on phase difference information corresponding to the matching cost between one of comparison candidate regions of the second correction candidate image and a comparison target region (e.g., region of interest) of the first correction candidate image. For example, the matching cost between the comparison candidate region and the comparison target region corresponding to each other may correspond to a matching cost having the highest correlation (or the lowest error rate). The image processor 260 may determine a depth map including pieces of depth information for pixels.

The processor 270 may perform additional image processing on an image (e.g., the first image, the second image, or a composite image of the first image and the second image) received from the image processor 260. For example, the processor 270 may perform image processing such as subsequent processing using colors, face detection, or subject tracking. As another example, the processor 270 may apply an optical effect (e.g., live focus, out focus, or Bokeh) to the received image based on the depth map.

The processor 270 may store an image signal provided by the image processor 260 in the memory 280 or display the image signal on the display 290. For example, the processor 270 may convert the image signal into a form supported by the memory 280 or the display 290 and transmit the image signal to the memory 280 or the display 290.

The memory 280 may store an image processed by the image processor 260. The display 290 may display the image data processed by the image processor 260 so as to allow the user to check the image data.

At least some processing of the image processor 260 according to the above-described embodiment may be performed by the processor 270. For example, the processor 270 may receive the first image and the second image from the image processor 260, generate a first correction candidate image and a second correction candidate image using the asymmetric blur features and the image height-specific blur features for the first image and the second image and determine a depth map based on the first correction candidate image and the second correction candidate image generated.

According to the above-described embodiment, the electronic device 200 may generate the first correction candidate image and the second correction candidate image by using the asymmetric blur features and the image height-specific blur features in a pixel basis.

Figure 3:
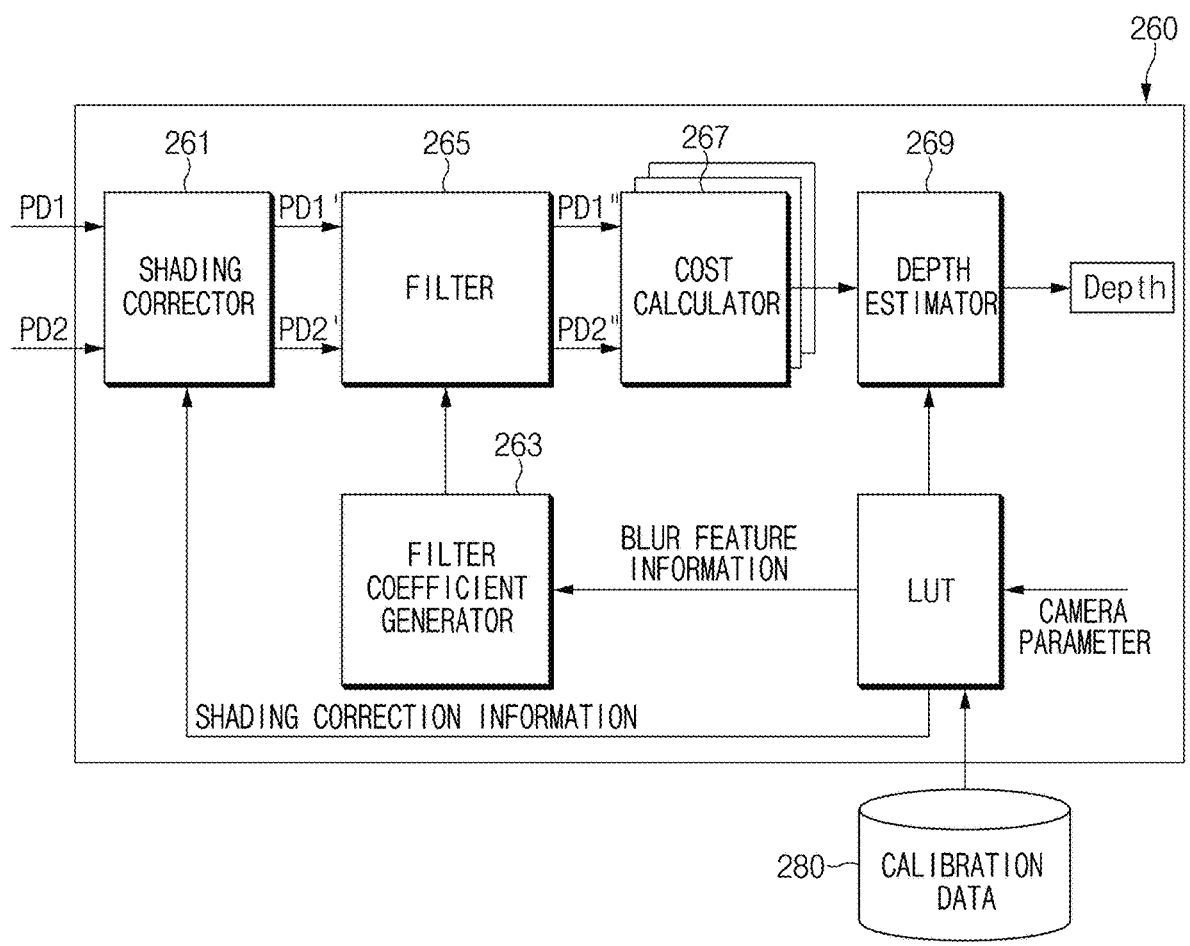
FIG. 3 is a configuration diagram of an image processor according to an embodiment.

FIG. 3 is a configuration diagram of an image processor 260 according to an embodiment. The image processor 260 receive the first image and the second image PD1, PD2 and generates depth information using a depth estimator 269. Shading corrector 261 receives the first image and the second image PD1 and PD2 and corrects an error in signal magnitude due to a difference in amount of light for each image height between the first image and the second image, thereby resulting in PD1' and PD2'. Filter 265 receives PD1' and PD2' and outputs PD1" and PD2" using filter coefficients from filter coefficient generator 263. Filter coefficient generator 263 generates a first point spread function (PSF) feature information and a second PSF feature information to be provided to the filter 265. The cost calculator 267 may select the first correction candidate images PD1" and the second correction candidate images PD2" corresponding to the same focus position, and calculate a matching cost for pixel values of pixels corresponding to each other in the first correction candidate images and the second correction candidate images. The depth estimator 269 may obtain depth information.

Referring to FIG. 3, the image processor 260 according to an embodiment may obtain the first image (e.g., a left image) PD1 and a second image (e.g., a right image) PD2. The image processor 260 may generate the first correction candidate images and the second correction candidate images by using the asymmetric blur features and image height-specific blur features corresponding to a plurality of focus positions. The image processor 260 may calculate matching costs between the first correction candidate images and the second correction candidate images for each focus position in a pixel basis. For example, the image processor 260 may obtain depth information of each pixel based on phase difference information corresponding to the matching cost between one of comparison candidate regions of the second correction candidate image and a comparison region (e.g., region of interest) of the first correction candidate image.

The matching cost between the comparison candidate region and the comparison target region corresponding to each other may correspond to a matching cost having the highest correlation (or the lowest error rate). The image processor 260 may determine a depth map including pieces of depth information for pixels.

The image processor 260 may include a filter coefficient generator 263, a shading corrector 261, a filter 265, a cost calculator 267, and a depth estimator 269. The components 261, 263, 265, 267, and 269 are classified according to functions, and some of the components may be combined or components other than the above components may be included. The components 261, 263, 265, 267, and 269 may be hardware modules including circuits or memory storing software or instructions.

The shading corrector 261 may correct an error in signal magnitude due to a difference in amount of light for each image height between the first image and the second image. The error may be corrected based on shading correction information (e.g., luminance weights of pixel values per image height) according to camera parameters (e.g., aperture value, OIS value, focus position value) included in the calibration data in a memory (e.g., the memory 280 of FIG. 2). The shading correction information in the memory 280 may be stored in the form of a lookup table (LUT) according to the camera parameters. The shading correction information SR0 according to the camera parameters may be a ratio of pixel values (e.g., luminance values) of the first group pixels and the second group pixels belonging to the same channel as in Equation 1 and may be different according to image heights. For another example, the shading correction information SR0 according to the camera parameters may be a ratio of a sum (PD1+PD2) of pixel values of the first group pixel and the second group pixel and a difference (PD1−PD2) and may be different according to image heights. The shading correction information may be determined in various forms different from embodiments described herein. According to certain embodiments, the shading correction information SR0 according to the camera parameters may be different for frequencies of reference colors (e.g., "RGB (red, green, blue)" or "RGBW (red, green, blue, white)" assigned to each pixel.

$$SR0(x, y, z, c, f) = \frac{PD_1(x, y, z, c, f)}{PD_2(x, y, z, c, f)} \quad \text{[Equation 1]}$$

x and y: Image heights of sensor
z: Position of AF lens
c: Color information
f: Aperture information $$SR0(x, y, z, c, f) = \frac{PD_1(x, y, z, c, f) - PD_2(x, y, z, c, f)}{PD_1(x, y, z, c, f) + PD_2(x, y, z, c, f)} \quad \text{[Equation 2]}$$

x and y: Image heights of sensor
z: Position of AF lens
c: Color information
f: Aperture information The shading corrector 261 may identify shading correction information corresponding to the camera parameters based on LUT, and correct a difference in signal magnitude due to a phase difference between the first group pixels and the second group pixels for each image height with respect to a first image PD1 and a second image PD2 based on the shading correction information. According to the above-described embodiment, the shading correction information in the memory 280 may be information having a lower resolution than that of the first image or the second image. In this case, the shading corrector 261 may interpolate the stored shading correction information to generate shading correction information corresponding to the resolution of the first image and the second image, and perform lens shading correction (LSC) on the first image and the second image based on the interpolated shading correction information. The shading correction information may include first shading correction information corresponding to the first group pixels and second shading correction information corresponding to the second group pixels. Alternatively, the shading correction information may be provided to scale the signal magnitude of the first group pixels to correspond to the signal magnitude of the second group pixels.

The filter coefficient generator 263 may generate first point spread function (PSF) feature information and second PSF feature information to be provided to the filter 265 based on calibration data stored in a memory (e.g., the memory 280 of FIG. 2). For example, the memory 280 may store pieces of first PSF feature information corresponding to the first group pixels and pieces of second PSF feature information corresponding to the second group pixels according to a plurality of focus positions. The pieces of first PSF feature information and the pieces of second PSF feature information may include asymmetric blur features and image height-specific blur features according to focus positions of the first group pixels and the second group pixels. The pieces of first PSF feature information and the pieces of second PSF feature information may include first PSF feature information and second PSF feature information corresponding to an on-focus position. In addition, the pieces of first PSF feature information and the pieces of second PSF feature information may include pieces of first PSF feature information and pieces of second PSF feature information corresponding to at least two defocus positions (e.g., near focus and far focus).

The filter 265 may output first image PD1" and second image PD2" which are corrected using first image PD1' and the second image PD2' between which the difference in signal magnitude due to the phase difference for image heights is corrected. For example, the filter 265 may be configured using a 1D (dimension) or 2D FIR (Finite Impulse Response) filter. For example, the filter 265 may generate first correction candidate images corresponding to the plurality of focus positions in a pixel basis by performing convolution on the first image PD1' and the pieces of second PSF feature information corresponding to the plurality of focus positions. Also, the filter 265 may generate second correction candidate images corresponding to the plurality of focus positions in a pixel basis by performing convolution on the second image PD2' and the pieces of first PSF feature information corresponding to the plurality of focus positions. According to certain embodiments, the number of the pieces of first PSF feature information and the pieces of second PSF feature information stored in the memory 280 may be set to correspond to a number corresponding to a first number (e.g., three) of focus positions less than the number of all focus positions of the lens part 210 (e.g., the number of movable positions of the lens part 210 along the optical axis). In this case, the memory 280 may further store pieces of first PSF information for interpolating the pieces of first PSF feature information, and pieces of second PSF information for interpolating the pieces of second PSF feature information. The filter 265 may generate a second number of first correction candidate images greater than the number of the pieces of first PSF feature information (e.g., the number of all focus positions) based on the pieces of first PSF feature information and the pieces of first PSF information and generate a second number of second correction candidate images greater than the number of the pieces of second PSF feature information based on the pieces of second PSF feature information and the pieces of second PSF information. For example, after generating the first correction candidate images corresponding to a plurality of focus positions based on the pieces of second PSF feature information, the filter 265 may select the first candidate images PD1" by modifying the first correction candidate images corresponding to the first image PD1' in a pixel basis to correspond to different focus positions based on the pieces of first PSF information (performing convolution on the second correction candidate image which has the highest correlation and the pieces of first PSF information). Similarly, after generating the second correction candidate images corresponding to a plurality of focus positions based on the pieces of second PSF feature information, the filter 265 may select the second candidate images PD2" by modifying the second correction candidate images corresponding to the second image PD2' in a pixel basis to correspond to different focus positions based on the pieces of first PSF information (performing convolution on the first correction candidate image which has the highest correlation and the pieces of second PSF information). According to certain embodiments, the first PSF information (or the second PSF information) may correspond to the first correction candidate images (or second correction candidate images) that are generated by operation (e.g., convolution) of the first image (or the second image) and the first PSF feature information (or the second PSF feature information).

According to certain embodiments, the filter 265 may correct the first image and the second image based on calibration data corresponding to a plurality of camera parameters. For example, the calibration data may include pieces of first PSF feature information and pieces of second PSF feature information respectively corresponding to a plurality of aperture values. In this case, the filter coefficient generator 263 may identify an aperture value at a time point at which the first image PD1 and the second image PD2 are obtained, and provide the pieces of first PSF feature information and the pieces of second PSF feature information corresponding to the identified aperture value among the pieces of first PSF feature information and the pieces of second PSF feature information respectively corresponding to the plurality of aperture values. The filter 265 may generate a first correction candidate image and a second correction candidate image based on the pieces of first PSF feature information and the pieces of second PSF feature information corresponding to the identified aperture value. For another example, after identifying that the lens part 210 has moved in a first direction (or a second direction perpendicular to the optical axis or the first direction) when the first image PD1 and the second image PD2 are obtained, the filter coefficient generator 263 may provide the pieces of first PSF feature information and the pieces of second PSF feature information to the filter 265 to correspond to the identified amount of movement (e.g., OIS value). The filter 265 may generate a first correction candidate image and a second correction candidate image based on the pieces of first PSF feature information and the pieces of second PSF feature information. As another example, the shading corrector 261 may identify a focus position when the first image PD1 and the second image PD2 are obtained, and correct a difference in signal magnitude due to a phase difference for image heights between the first image and the second image based on the shading correction information corresponding to the identified focus position.

The cost calculator 267 may select the first correction candidate images PD1" and the second correction candidate images P2" corresponding to the same focus position, and calculate a matching cost for pixel values of pixels corresponding to each other in the first correction candidate images and the second correction candidate images which are selected. The pixels corresponding to each other in the first correction candidate images and the second correction candidate images may be pixels having, for example, the same (x, y) values. Here, the x value may be a column position, and the y value may be a row position. The cost calculator 267 may calculate a matching cost using a method of detecting an error such as sum of squared difference (SSD), mean of absolute difference (MAD), or sum of absolute difference (SAD) with respect to pixel values of pixels corresponding to each other.

The depth estimator 269 may obtain depth information of each pixel based on phase difference information corresponding to the matching cost between one of comparison candidate regions of the second correction candidate image and a comparison target region (e.g., region of interest) of the first correction candidate image, among matching costs for each pixel. For example, the matching cost between the comparison candidate region and the comparison target region corresponding to each other may correspond to a matching cost having the highest correlation (or the lowest error rate). The depth estimator 269 may generate a depth map including depth information for each pixel.

According to the above-described embodiment, the image processor 260 may generate a first correction candidate image for the first image and a second correction candidate image for the second image, and generate a depth map including pieces of depth information for pixels of the first image and the second image by using a difference in signal magnitude for image heights due to a phase difference between the first group pixels and the second group pixels, asymmetric blur features, and image height-specific blur features.

Figure 4:
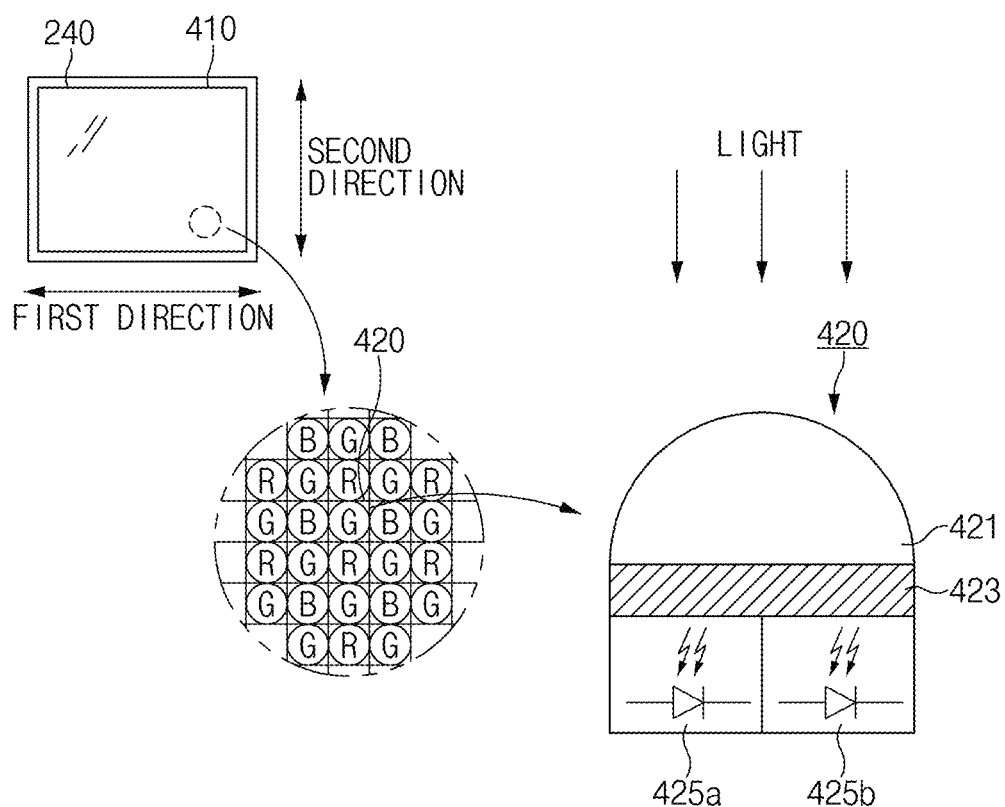
FIG. 4 is a configuration diagram of an image sensor according to an embodiment.

FIG. 4 is a configuration diagram of an image sensor 240 according to an embodiment. The image sensor 240 includes a pixel array 410 comprising a matrix of M*N pixels. Each pixel includes a micro lens 421 a color filter 423, a first light receiving element (which can be a photodiode 425a) and a second light receiving element (which can be a second photodiode 425b). The light receiving elements convert light to an electronic signal indicative of the light. The signals from the first light receiving elements 425a can be considered the first image and the signals from the second light receiving elements 425b can be considered the second image. As can be seen, the positions of the first light receiving elements 425a and the positions of the second light receiving elements 425b can are different, thereby resulting in pictures having different phases.

Referring to FIG. 4, an image sensor (e.g., the image sensor 240 of FIG. 2) may include a pixel array 410 including a plurality of pixels arranged in the matrix of M*N in a first direction (e.g., row) and a second direction (e.g., column). Each of the pixels may be assigned one of a plurality of reference colors. The plurality of reference colors may include, for example, "RGB (red, green, blue)" or "RGBW (red, green, blue, white)". The plurality of pixels may include first group pixels that receive light that has passed through a lens part (e.g., the lens part 210 of FIG. 2) and an aperture (e.g., the aperture 230 of FIG. 2) through a first optical path group and second group pixels that receive light that has passed through the lens part 210 and the aperture 230 through a second optical path group.

The image sensor 240 may include a micro lens 421, a color filter 423, at least one first light receiving element 425a and at least one second light receiving element 425b for one color channel 420 assigned a reference color (hereinafter, referred to as "unit image sensor"). The image sensor 240 may further include other components. For example, the image sensor 240 may include an infrared blocking filter for blocking at least a part of infrared rays of light incident through the micro lens 421, or a reflection preventing film for preventing light incident through the micro lens 421 from being reflected. As another example, the image sensor 240 may further include components such as a conductor pattern or a high refractive index pattern.

The micro lens 421 may induce the incident light to a first optical path to the first light receiving element 425a and a second optical path to the second light receiving element 425b.

The color filter 423 may allow light with a specified reference color to pass therethrough. The reference color may include R (red), G (green), and B (blue) or R (red), G (green), B (blue), and W (white). The color filter 423 may include a red filter through which red light passes, a green filter through which green light passes, and a blue filter through which blue light passes. For a pixel array, the color filter 423 may be arranged to have a Bayer pattern.

The first light receiving element 425a and the second light receiving element 425b may be, for example, photo diodes formed on a semiconductor substrate. The first light receiving element 425a may generate charges according to the intensity (or the amount of light) of light received by the photoelectric effect. A pixel value may be determined based on the amount of charge. The first light receiving element 425a may belong to first group pixels that receive light that has passed through the first optical path, and the second light receiving element 425b may belong to second group pixels that receive light that has passed through the second optical path.

It has been described with reference to FIG. 4 that two light receiving elements 425a and 425b are included in one color channel covered with one color filter, as an example. However, the disclosure is not limited thereto. For example, more than two light receiving elements may be disposed in one color channel. An image sensor in which more than two light receiving elements are disposed in one color channel may be referred to as a multi-pixel image sensor, and an image sensor in which two light receiving elements are disposed may be referred to as a dual-pixel image sensor.

Figure 5:
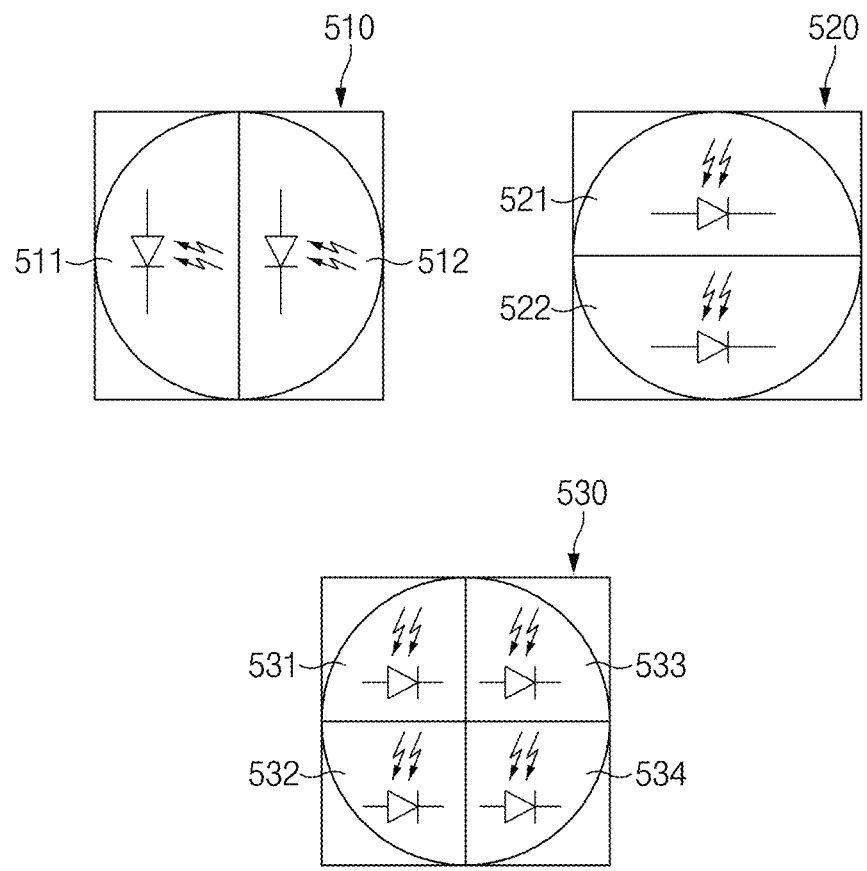
FIG. 5 illustrates an arrangement structure of a plurality of light receiving elements belonging to a unit image sensor according to an embodiment.

FIG. 5 illustrates an arrangement structure of a plurality of light receiving elements belonging to a unit image sensor according to an embodiment.

Referring to FIG. 5, a unit image sensor 510 may include a first light receiving element 511 and a second light receiving element 512 arranged in a horizontal direction, and receive light having a phase difference in the horizontal direction and generate a first image and a second image having a phase difference in a vertical direction with respect to the same subject. The unit image sensor 520 may include a first light receiving element 521 and a second light receiving element 522 arranged in the vertical direction, and receive light having a phase difference in the vertical direction and generate a first image and a second image having a phase difference in a vertical direction with respect to the same subject. A unit image sensor 530 may include a first light receiving element 531 disposed at an upper left end, a second light receiving element 532 disposed at a lower left end, a third light receiving element 533 disposed at an upper right end, and a fourth light receiving element 534 disposed at a lower right end. The first to fourth light receiving elements 531, 532, 533, and 534 may receive light having a phase difference in at least one of the horizontal direction or the vertical direction, and generate a first image, a second image, a third image, and a fourth image which have different phase differences with respect to the same subject.

Figure 6:
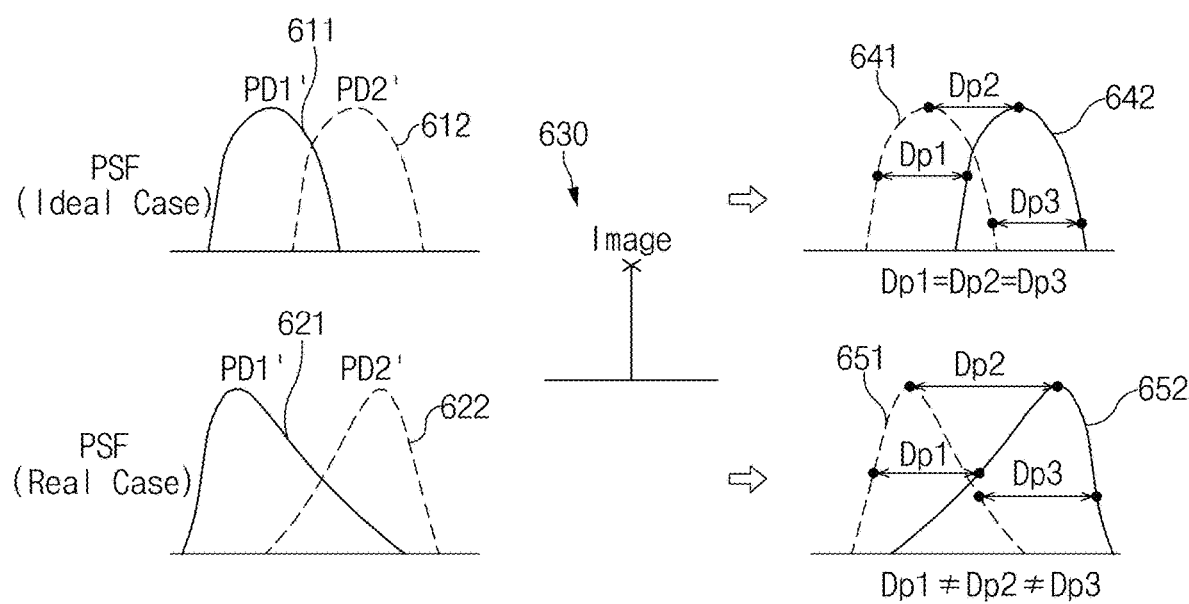
FIG. 6 is a diagram for describing an effect of asymmetric blur features on depth information according to an embodiment.

FIG. 6 is a diagram for describing an effect of asymmetric blur features on depth information according to an embodiment.

Referring to FIG. 6, in an ideal case, first PSF feature information 611 corresponding to first group pixels may be symmetric to second PSF feature information 612 corresponding to second group pixels. In this regard, when the first PSF feature information 611 and the second PSF feature information 612 which are ideal are convolved with an image 630 of a subject at the same distance, pieces of depth information (Dp1=Dp2=Dp3) determined from a convolution result image 641 of the first PSF feature information 611 and a convolution result image 642 of the second PSF feature information 612 may be identical to one another.

However, in a real case, first PSF feature information 621 corresponding to the first group pixels may be asymmetric to second PSF feature information 622 corresponding to the second group pixels. In this regard, when the first PSF feature information 621 and the second PSF feature 622 612 which are realistic are convolved with the image 630 of a subject at the same distance, the pieces of depth information (Dp1≠Dp2≠Dp3) determined from a convolution result image 651 of the first PSF feature information 611 and a convolution result image 652 of the second PSF feature information 612 may be different from one another. As described above, the asymmetric blur features between the first group pixels and the second group pixels may cause an error in the depth information.

Figure 7:
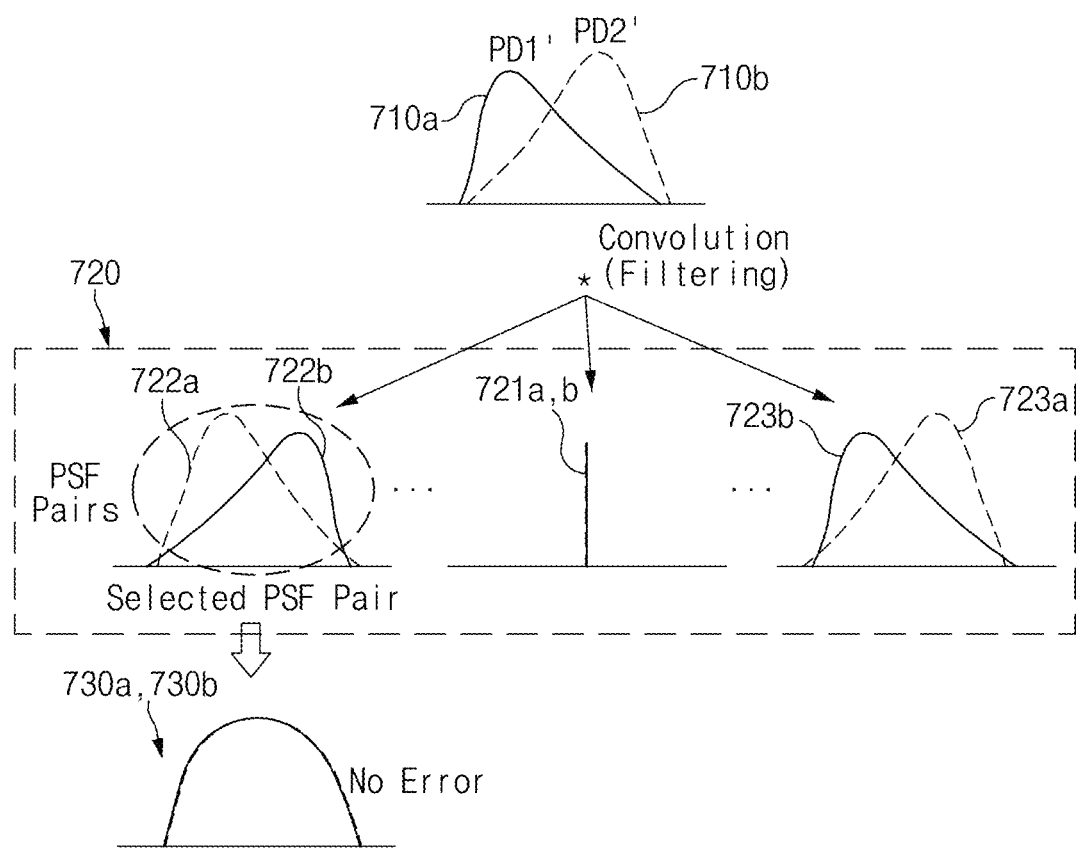
FIG. 7 is a diagram for describing a method for correcting asymmetric blur features according to an embodiment.

FIG. 7 is a diagram for describing a method for correcting asymmetric blur features according to an embodiment.

Referring to FIG. 7, pieces of first PSF feature information 721a, 722a, and 723a and pieces of second PSF feature information 721b, 722b and 723b corresponding to different focus positions may be stored in a memory (e.g., the memory 280 of FIG. 2). An image processor (e.g., the image processor 260 of FIG. 2) may convolve a first image 710a obtained using an image sensor (e.g., the image sensor 240 of FIG. 2) with the pieces of first PSF feature information 721a, 722a and 723a, respectively, and convolve a second image 710b obtained using the image sensor 240 with the pieces of second PSF feature information 721b, 722b and 723b, respectively. For example, the image processor 260 may generate a first correction candidate image 730a by convolving the first image 710a with the first PSF feature information 722a. Also, the image processor 260 may generate a second correction candidate image 730b by convolving the second image 710b with the second PSF feature information 722b. Similarly, the image processor 260 may generate first correction candidate images and second correction candidate images by convolving the first image 710a with the second image 710b with the first PSF feature information 721a and 723a and the second PSF feature information 821b and 723b, respectively. The first PSF feature information 722a may have blur features opposite to those of the second image 710b. Also, the second PSF feature information 722b may have blur features opposite to those of the first image 710a. According to the above-described embodiment, the image processor 260 may generate first and second correction candidate images by using the pieces of first PSF feature information and the pieces of second PSF feature information. Also, the image processor 260 may determine depth information by using the first correction candidate image 730a and the second correction candidate image 730b having the smallest matching cost in a pixel basis to lower and remove an error in the depth information.

Figure 8:
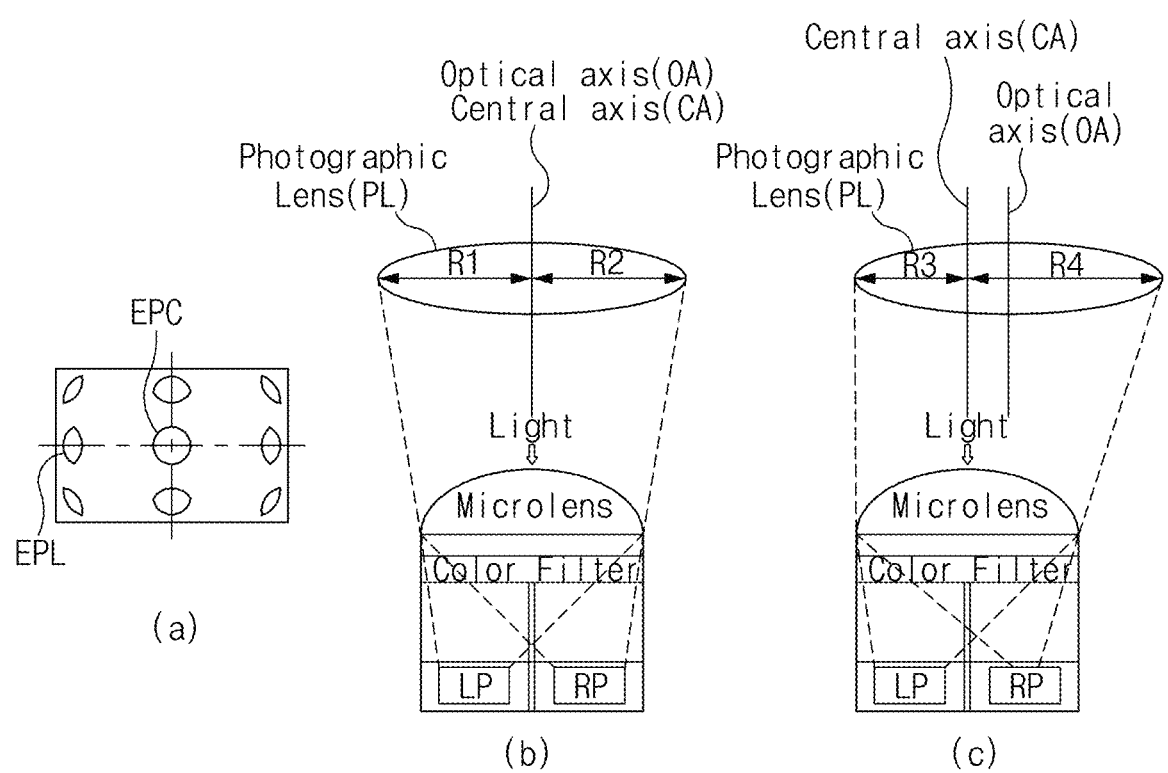
FIG. 8 is a diagram for describing image height-specific blur features according to an embodiment.

FIG. 8 is a diagram for describing image height-specific blur features according to an embodiment. In FIG. 8, (a) shows a shape of an exit pupil according to a position of an image sensor (e.g., the image sensor 240 of FIG. 2). The exit pupil may generally mean a hole through which light exits, and in this specification, may mean the shape of a light receiving region when looking at a camera lens PL (e.g., the lens part 210 of FIG. 2) from the image sensor. For example, the shape of the exit pupil may correspond to point spread functions EPL and EPC for each image height corresponding to a subject having the same shape.

Referring to (a) and (b) of FIG. 8, when a central axis CA of a pixel and an optical axis OA of the camera lens PL are identical to each other, a distance R1 from the central axis CA of the pixel to the left end of the camera lens PL may be equal to a distance R2 from the central axis CA of the pixel to the right end of the camera lens PL. Accordingly, because the amount of light incident on a first light receiving element LP (e.g., the first light receiving element 425a of FIG. 4) is equal to the amount of light incident on a second light receiving element RP (e.g., the second light receiving element 425b of FIG. 4), the shape of a central exit pupil (EPC) may be created.

Referring to (a) and (c) of FIG. 8, when the central axis CA of the pixel is deviated to the left from the optical axis OA of the camera lens PL, a distance R3 from the central axis CA of the pixel to the left end of the camera lens PL may be shorted to a distance R4 from the central axis CA of the pixel to the right end of the camera lens PL. Accordingly, since the amount of light incident on the first light receiving element LP is greater than the amount of light incident on the second light receiving element RP, the shape of the left exit pupil EPL may be created. As described above, each pixel of the image sensor 240 may have a blur error for each image height. However, the image processor 260 according to an embodiment may generate a first correction candidate image and a second correction candidate image based on first PSF feature information and second PSF feature information and correct the blur error for each image height.

According to certain embodiments, light reflected from a subject disposed in front of the camera lens PL may pass through the camera lens PL and be transmitted to the first light receiving element LP and the second light receiving element RP. Light corresponding to the first optical path group among the reflected light may be incident through a first part (e.g., a range corresponding to R1) of the camera lens PL, and light corresponding to the second optical path group among the reflected lights may be incident through a second part (e.g., a range corresponding to R2) of the camera lens PL. Light of the first optical path group and light of the second optical path group may be substantially symmetrically incident on the first group pixels and the second group pixels in the first light receiving element LP and the second light receiving element RP. However, the light of the first optical path group and light of the second optical path group may be incident asymmetrically on unit image sensors (e.g., the unit image sensors 240 of FIG. 4) located in the periphery of the first light receiving element LP and the second light receiving element LP.

Figure 9:
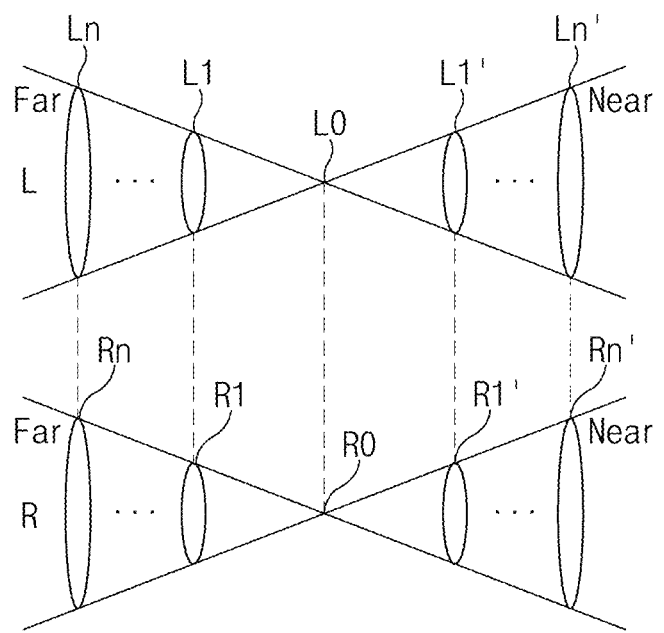
FIG. 9 is a diagram for describing a process of calculating a matching cost of an image processor according to an embodiment.
Figure 10:
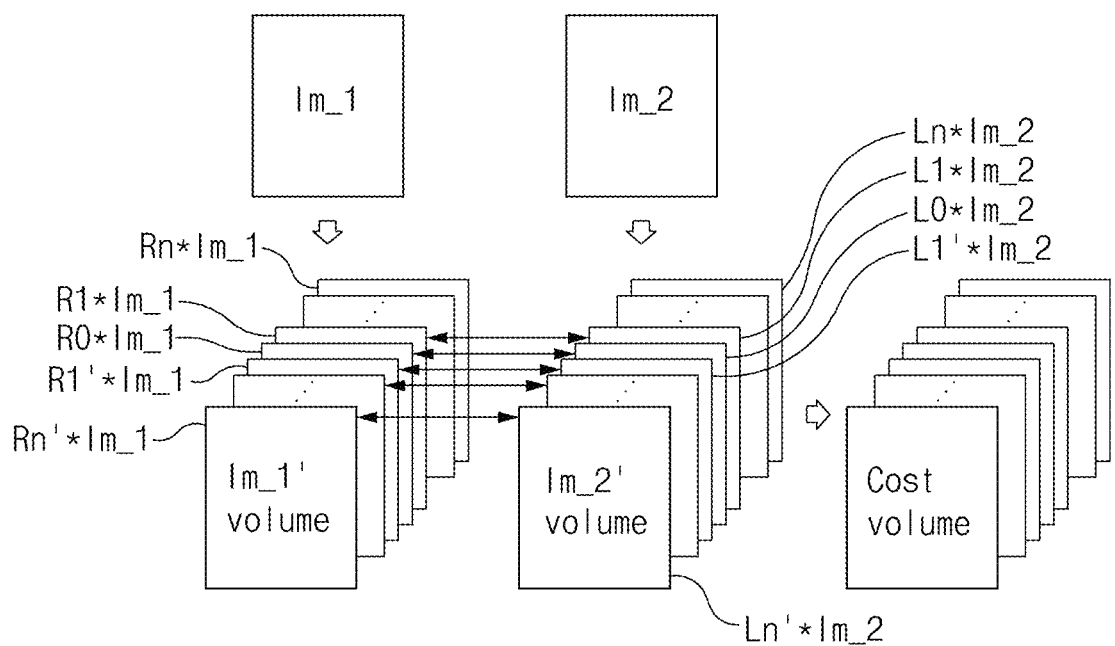
FIG. 10 is a diagram for describing a process of calculating a matching cost of an image processor according to an embodiment.

FIG. 9 is a diagram for describing a process of calculating a matching cost of an image processor according to an embodiment. FIG. 10 is a diagram for describing a process of calculating a matching cost of an image processor according to an embodiment.

Referring to FIG. 9, a memory (e.g., the memory 280 of FIG. 2) may store pieces of first PSF feature information for the first group pixels L and pieces of second PSF feature information for the second group pixels R, which respectively correspond to focus positions (see dotted line) and are paired with each other. For example, the memory 280 may store first PSF feature information L0 and second PSF feature information R0 corresponding to an on-focus position, first PSF feature information L1 and second PSF feature information R1 corresponding to a first focus position on the side of the far field, and first PSF feature information Ln and second PSF feature information Rn corresponding to the n-th focus position on the side of the far field. In addition, the memory 280 may store PSF feature information L1' and second PSF feature information R1' corresponding to a first focus position on the side of the near field, and first PSF feature information Ln' and second PSF feature information Rn' corresponding to the n-th focus position on the side of the near field.

Referring to FIG. 10, the image processor (e.g., the image sensor 240 of FIG. 2) may obtain a first image IM_1 (e.g., a left image) using first group pixels included in the image sensor 240 and obtain a second image IM_2 (e.g., a right image) using second group pixels. The image processor 260 may generate a plurality of first correction candidate images (Im_1' volume) by convolving the first image IM_1 with pieces of second PSF feature information (Rn, R1, R0, R1' and Rn' of FIG. 9) in a pixel basis. The image processor 260 may generate a plurality of second correction candidate images (Im_2' volume) by convolving the second image IM_2 with pieces of first PSF feature information (Ln, L1, L0, L1' and Ln' of FIG. 9) in a pixel basis. The image processor 260 may sequentially select a plurality of first correction candidate images (Im_1' volume) and a plurality of second correction candidate images (Im_2' volume) corresponding to the same focus position (see solid double arrow), and calculate a matching cost (cost volume) in a pixel basis with respect to the first correction candidate image and the second correction candidate image corresponding to the selected focus position. The image processor 260 may identify a focus position having the smallest matching cost for pixels, and determine depth information for each pixel based on the identified focus position. The image processor 260 may generate a depth map including pieces of depth information for the determined pixels.

Figure 11:
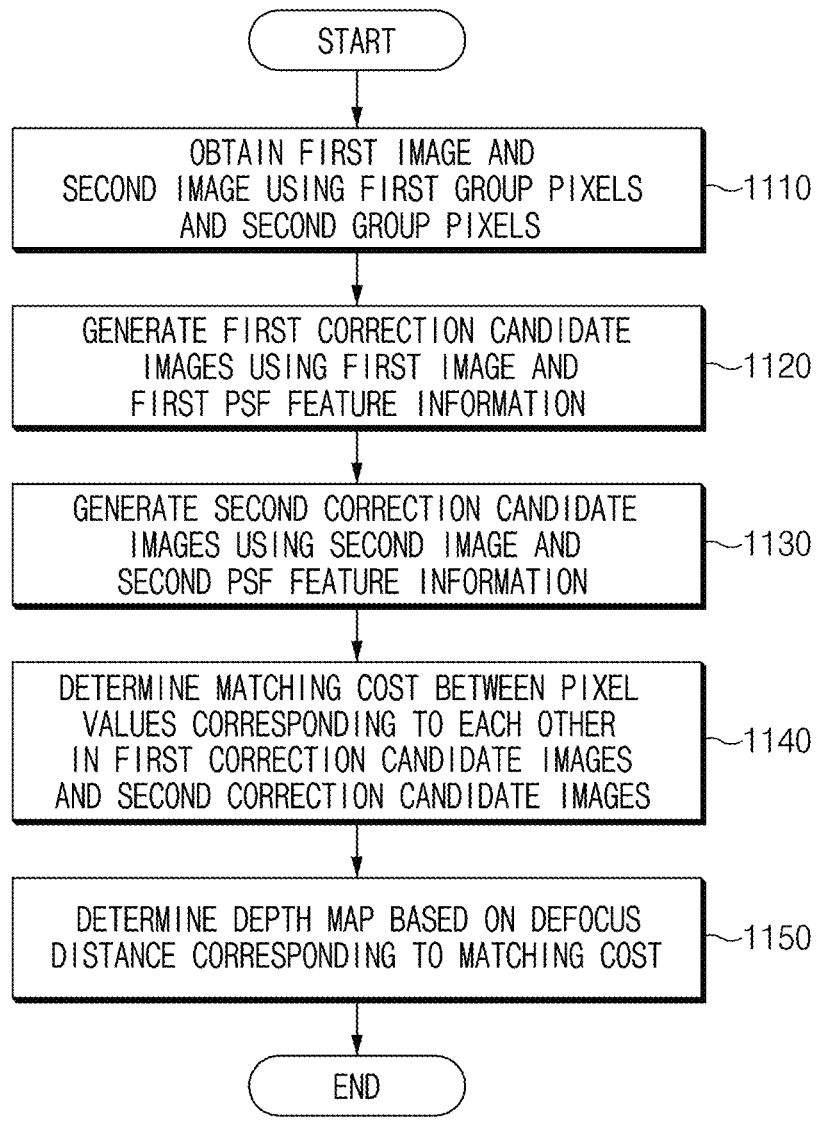
FIG. 11 illustrates a method of generating a depth map according to an embodiment.

FIG. 11 illustrates a method of generating a depth map according to an embodiment.

Referring to FIG. 11, in operation 1110, the image processor (e.g., the image processor 260 of FIG. 2) may obtain a first image and a second image using first group pixels and second group pixels included in an image sensor (e.g., the image sensor 240 of FIG. 2). The first group pixels may receive light that has passed through a lens part of a camera (e.g., the lens part 210 of FIG. 2) through a first optical path group, and the second group pixels may receive light that has passed through the lens part 210 of the camera through a second optical path group.

In operation 1120, the image processor 260 may generate first correction candidate images corresponding to a plurality of focus positions by using the first image and the pieces of first PSF feature information corresponding to the plurality of focus positions. The pieces of first PSF feature information may be determined, for example, through a calibration process of identifying blur features of the first group pixels corresponding to a plurality of focus positions. For example, the image processor 260 may correct an error for asymmetric blur features and image height-specific blur between the first group pixels and the second group pixels according to a plurality of focus positions according to a plurality of focus positions using the pieces of first PSF feature information.

In operation 1130, the image processor 260 may generate second correction candidate images corresponding to a plurality of focus positions by using the second image and the pieces of second PSF feature information corresponding to the plurality of focus positions. The pieces of second PSF feature information may be determined, for example, through a calibration process of identifying blur features of the second group pixels corresponding to a plurality of focus positions. For example, the pieces of second PSF feature information may correct an error for asymmetric blur features and image height-specific blur between the first group pixels and the second group pixels according to a plurality of focus positions.

In operation 1140, the image processor 260 may determine matching costs between the first correction candidate images and the second correction candidate images corresponding to the same focus position in a pixel basis. For example, the image processor 260 may select a first correction candidate image and a second correction candidate image corresponding to the same focus position from among first correction candidate images and second correction candidate images, and calculate a matching cost between the first correction candidate image and the second correction candidate image corresponding to the selected focus position in a pixel basis. The matching cost may be calculated based on sum of squared difference (SSD), mean of absolute difference (MAD), or sum of absolute difference (SAD).

In operation 1150, the image processor 260 may identify a focus position corresponding to the smallest matching cost for each pixel, and determine depth information corresponding to the identified focus position for each pixel. The image processor 260 may determine a depth map including the determined piece of depth information for pixels.

Figure 12:
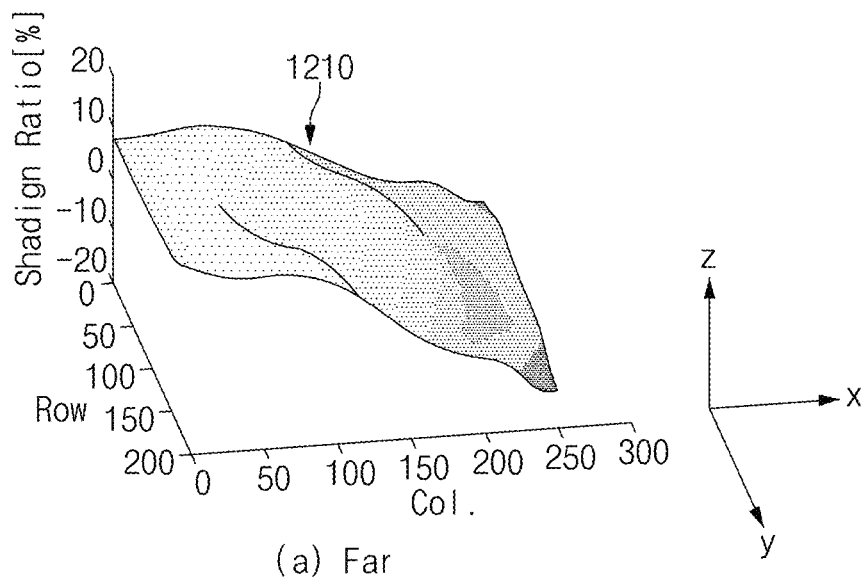
FIG. 12 illustrates shading correction information corresponding to a plurality of focus positions according to an embodiment.
Figure 12:
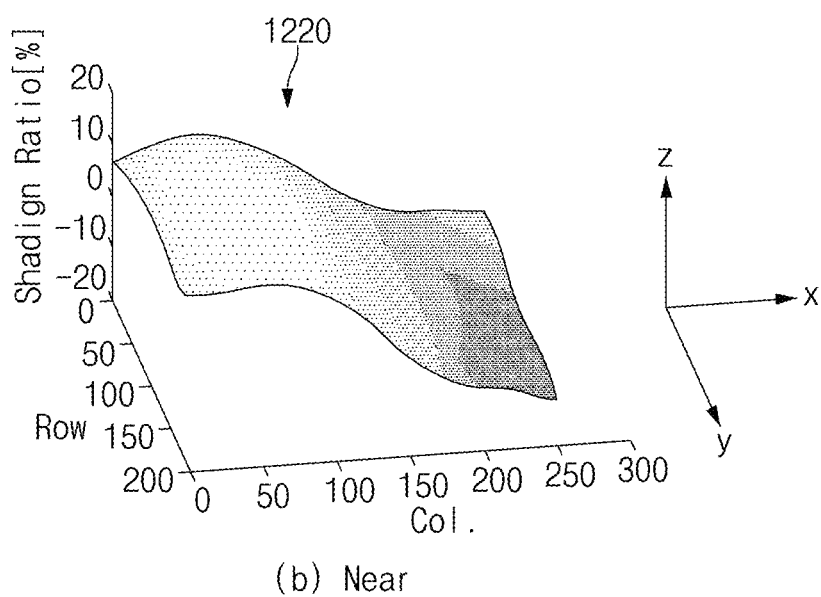

FIG. 12 illustrates shading correction information corresponding to a plurality of focus positions according to an embodiment. In FIG. 12, x-axis is a column direction of a pixel array included in the image sensor 240, y-axis is a row direction of the pixel array, and z-axis represents a ratio of signal magnitude between first group pixels and second group pixels corresponding to each other, which are included in the pixel array.

Referring to FIG. 12, graph 1210 shows first shading correction information for each pixel at a focus position in the side of the far field which is out of the on focus of a lens part (the lens part 210 of FIG. 2) of a camera closest to the image sensor 240. The first shading correction information may be a signal magnitude ratio of the second group pixels with respect to the first group pixels corresponding to each other, which are identified from a first reference image and a second reference image obtained by photographing, for example, a calibration chart (e.g., white paper) at a far filed position of the lens part 210. A graph 1220 shows second shading correction information for each pixel at a focus position on the side of the near field closest to the on-focus of the lens part 210 that is most spaced apart from the image sensor 240. The second shading correction information may be a signal magnitude ratio of the second group pixels with respect to the first group pixels, which are identified from a first image and a second image obtained by photographing, for example, a calibration chart (e.g., white paper) at a near filed position of the lens part 210.

According to an embodiment, an image processor (e.g., the image processor 260 of FIG. 2) may determine shading correction information corresponding to a position of the lens part 210 at a time point at which the first image and the second image are obtained, based on the first shading correction information and the second shading correction information (determine shading correction information corresponding to the position of the lens part 210 by interpolating the first and second shading correction information) and correct a difference in signal magnitude due to a phase difference for image heights between the first image and the second image based on the determined shading correction information.

Figure 13:
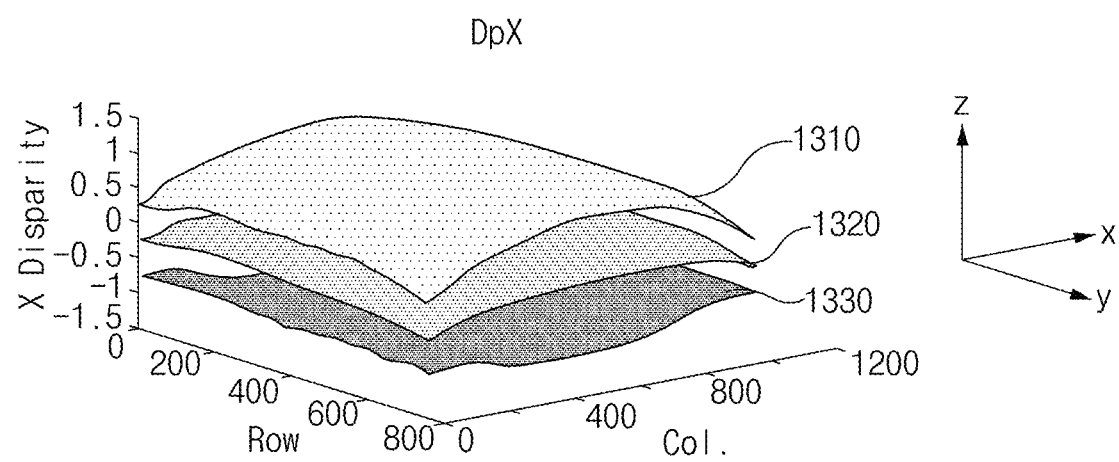
FIG. 13 illustrates disparities corresponding to a plurality of focus positions according to an embodiment.

FIG. 13 illustrates disparities corresponding to a plurality of focus positions according to an embodiment. In FIG. 13, x-axis is a column direction of a pixel array included in the image sensor 240, y-axis is a row direction of the pixel array, and the z-axis is a disparity in the x-axis direction determined from each pixel corresponding to a subject located at the same distance.

Referring to FIG. 13, a graph 1310 is a disparity corresponding to a subject located at the same distance as a focus on the side of the far field, which may be obtained from an image obtained by photographing a subject located at the same distance with the lens part 210 located at the focus position on the side of the far field. A graph 1320 is a disparity corresponding to a subject at the same distance as an on-focus position, which may be obtained from a first image and a second image obtained by photographing a subject located at the same distance with the lens part 210 located at the on-focus position. A graph 1330 is a disparity corresponding to a subject at the same distance as a focus position on the side of the near filed, which may be obtained from a first image and a second image obtained by photographing a subject located at the same distance with the lens part 210 located at a focus position on the side of the near field. The image processor 260 may improve a disparity error for each image height based on first PSF feature information and the second PSF feature information provided so as to remove the disparity error for each image height corresponding to the focus position as in FIG. 13.

According to the above-described embodiments, the image processor 260 may generate a first correction candidate image and a second correction candidate image according to image height-specific blur features and asymmetric blur features, thereby providing depth information including pieces of depth information for each pixel of the image processor 260.

According to the above-described embodiments, an electronic device (e.g., the electronic device 200 of FIG. 2) may include a at least one lens (e.g., the lens part 210 of FIG. 2), an image sensor (e.g., the image sensor 240 of FIG. 2) including first group of pixels receiving the light that has passed through the at least one lens through a first optical path group and second group of pixels receiving the light that has passed through the at least lens through a second optical path group, a memory (e.g., the memory 280 of FIG. 2) that stores first point spread function (PSF) feature information corresponding to the first group pixels and second PSF feature information corresponding to the second group pixels with respect to a plurality of focus positions of the at least one lens, and a processor (e.g., the processor 270 of FIG. 2) operatively connected to the driving circuit, the image sensor, and the memory, wherein the processor may obtain a first image by using the first group pixels and the second image by using the second group pixels, generate first correction candidate images based on the first image and the second PSF feature information, generate second correction candidate images based on the second image and the first PSF feature information, and determine a depth map corresponding to matching costs between the first correction candidate images and the second correction candidate images.

According to certain embodiments, the first PSF feature information and the second PSF feature information may be set to substantially correct asymmetric blur features between the first group pixels and the second group pixels at the plurality of focus positions.

According to certain embodiments, the first PSF feature information may be set to substantially correct a blur error for each image height for the first group pixels at the plurality of focus positions, and the second PSF feature information may be set to substantially correct a blur error for each image height for the second group pixels at the plurality of focus positions.

According to certain embodiments, the memory (e.g., the memory 280 of FIG. 2) may store shading correction information for substantially correcting a difference in signal magnitude for each image height between the first group pixels and the second group pixels, and the processor (e.g., the processor 270 of FIG. 2) may correct a difference in signal magnitude for each image height between the first image and the second image using the shading correction information, and generate the first correction candidate images and the second correction candidate images based on the corrected first image and the corrected second image.

According to certain embodiments, the memory (e.g., the memory 280 of FIG. 2) may store first PSF information for interpolating the first PSF feature information, and second PSF information for interpolating the of second PSF feature information and the processor (e.g., the processor 270 of FIG. 2) may generate a number of first correction candidate images which is greater than a number of pieces of first PSF feature information based on the pieces of first PSF feature information and the pieces of first PSF information, and generate a number of second correction candidate images which is greater than a number of pieces of second PSF feature information based on the pieces of second PSF feature information and the pieces of second PSF information.

According to certain embodiments, the processor (e.g., the processor 270 of FIG. 2) may generate the first correction candidate images corresponding to the plurality of focus positions by convolving the first image with the first PSF feature information according to the plurality of focus positions in a pixel basis, and generate the second correction candidate images corresponding to the plurality of focus positions by convolving the second image with the of second PSF feature information according to the plurality of focus positions in a pixel basis.

According to certain embodiments, the processor (e.g., the processor 270 of FIG. 2) may select a first correction candidate image and a second correction candidate image corresponding to an identical focus position from among the first correction candidate images and the second correction candidate images, and calculate a matching cost of pixels corresponding to each other based on pixel values of the pixels corresponding to each other between the first correction candidate image and the second correction candidate image selected.

According to certain embodiments, the processor (e.g., the processor 270 of FIG. 2) may identify a focus position where a difference between pixel values calculated for pixels is smallest, and determine the depth map including pieces of depth information corresponding to the identified focus positions for the pixels.

According to certain embodiments, the first PSF feature information and the second PSF feature information may be set to correspond to a plurality of aperture values respectively, and the processor (e.g., the processor 270 of FIG. 2) may identify an aperture value when the first image and the second image are obtained, and generate the first correction candidate images and the second correction candidate images based on the first PSF feature information and the second PSF feature information corresponding to the identified aperture value of the plurality of aperture values.

According to certain embodiments, the electronic device may further include a display (e.g., the display 290 of FIG. 2), and the processor (e.g., the processor 270 of FIG. 2) may apply an optical effect to at least one of the first image and the second image based on the depth map, and display the at least one image to which the optical effect is applied on the display.

According to certain embodiments, a method for determining a depth map in an electronic device (e.g., the electronic device 200 of FIG. 2) may include obtaining a first image by using first group pixels receiving light that has passed through at least one lens (e.g., the lens part 210 of FIG. 2), through a first optical path group and obtaining a second image by using second group pixels receiving light that has passed through the at least one lens part, through a second optical path group, obtaining of first point spread function (PSF) feature information corresponding to the first group pixels and second PSF feature information corresponding to the second group pixels with respect to a plurality of focus positions, generating first correction candidate images based on the first image and the second PSF feature information and generating second correction candidate images based on the second image and the first PSF feature information, identifying matching costs between the first correction candidate images and the second correction candidate images in units of pixels, and determining a depth map corresponding to the matching costs between the first correction candidate images and the second correction candidate images.

According to certain embodiments, the first PSF feature information and the second PSF feature information may be set to correct asymmetric blur features between the first group of pixels and the second group of pixels at the plurality of focus positions.

According to certain embodiments, the first PSF feature information may be set to correct a blur error for each image height for the first group pixels at the plurality of focus positions, and the second PSF feature information may be set to correct a blur error for each image height for the second group pixels at the plurality of focus positions.

According to certain embodiments, the method may further include correcting a difference in signal magnitude for each image height between the first image and the pieces of second image using the shading correction information, and the generating of the first correction candidate images and the second correction candidate images may include generating the first correction candidate images based on the corrected first image and generating the second correction candidate images based on the corrected second image.

According to certain embodiments, the generating of the first correction candidate images and the second correction candidate images may include generating a number of first correction candidate images which is greater than a number of the pieces of first PSF feature information based on the pieces of first PSF information for interpolating the pieces of first PSF feature information and the pieces of first PSF information, and generating a number of second correction candidate images which is greater than a number of the pieces of second PSF feature information based on the pieces of second PSF information for interpolating the pieces of second PSF feature information and the pieces of second PSF information.

According to certain embodiments, the generating of the first correction candidate images and the second correction candidate images may include generating the first correction candidate images corresponding to the plurality of focus positions by convolving the first image with the first PSF feature information according to the plurality of focus positions in a pixel basis, and generating the second correction candidate images corresponding to the plurality of focus positions by convolving the second image with the second PSF feature information according to the plurality of focus positions in a pixel basis.

According to certain embodiments, the identifying of the matching cost may include selecting a first correction candidate image and a second correction candidate image corresponding to an identical focus position from among the first correction candidate images and the second correction candidate images, and calculating matching costs of pixels corresponding to each other based on pixel values of the pixels corresponding to each other between the first correction candidate image and the second correction candidate image selected.

According to certain embodiments, the identifying of the matching cost may include identifying a focus position where a difference between pixel values calculated for pixels is smallest, and determining the depth map including pieces of depth information corresponding to the identified focus positions for the pixels.

According to certain embodiments, the generating of the first correction candidate images and the second correction candidate images may include identifying an aperture value when the first image and the second image are obtained, and generating the first correction candidate images and the second correction candidate images based on the pieces of first PSF feature information and the pieces of second PSF feature information corresponding to the identified aperture value of the plurality of aperture values.

According to certain embodiments, the generating of the first correction candidate images and the second correction candidate images may applying an optical effect to at least one of the first image and the second image based on the depth map and displaying the at least one image, to which the optical effect has been applied, on a display.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one lens;
   an image sensor including first group pixels receiving a part of light that has passed through the at least one lens through a first optical path group and second group pixels receiving another part of the light that has passed through the at least one lens through a second optical path group;
   a memory configured to store first point spread function (PSF) feature information including a first asymmetric blur features and a first image height-specific blur features of the first group pixels and second PSF feature information including a second asymmetric blur features and a second image height-specific blur features of the second group pixels with respect to a plurality of focus positions of the at least one lens; and
   a processor operatively connected to the image sensor, and the memory, wherein the memory stores instructions executable by the processor to cause the electronic device to:
   obtain a first image using the first group pixels and a second image using the second group pixels;
   generate first correction candidate image based on the first image and the second PSF feature information;
   generate second correction candidate image based on the second image and the first PSF feature information;
   calculate matching costs between a first region of interest (ROI) in a pixel basis of the first correction candidate image and a second ROI in the pixel basis of the second correction candidate image; and determine a depth map corresponding to the matching costs between the first ROI and the second ROI.

2. The electronic device of claim 1, wherein the instructions are further executable by the processor to cause the electronic device to: correct asymmetric blur features between the first group pixels and the second group pixels at the plurality of focus positions, based on the first PSF feature information and the second PSF feature information.

3. The electronic device of claim 1,
wherein the first PSF feature information corrects a blur error for each image height for the first group pixels at the plurality of focus positions, and
wherein the second PSF feature information are set to correct a blur error for each image height for the second group pixels at the plurality of focus positions.

4. The electronic device of claim 1,
wherein the memory stores shading correction information for correcting a difference in signal magnitude for each image height between the first group pixels and the second group pixels;
wherein the instructions are further executable by the processor to cause the electronic device to:
correct a difference in signal magnitude for each image height between the first image and the pieces of second image using the shading correction information, and
generate the first correction candidate image and the second correction candidate image based on the corrected first image and the corrected second image.

5. The electronic device of claim 1,
wherein the memory is configured to further store first PSF information for interpolating the first PSF feature information, and second PSF information for interpolating second PSF feature information, and
wherein the instructions are further executable by the processor to cause the electronic device to:
generate a number of first correction candidate image which is greater than a number of pieces of first PSF feature information based on the pieces of first PSF feature information and the pieces of first PSF information, and
generate a number of second correction candidate image which is greater than a number of pieces of second PSF feature information based on the pieces of second PSF feature information and the pieces of second PSF information.

6. The electronic device of claim 1,
wherein the instructions are further executable by the processor to cause the electronic device to:
generate the first correction candidate image corresponding to the plurality of focus positions by convolving the first image with the second PSF feature information according to the plurality of focus positions in a pixel basis, and
generate the second correction candidate image corresponding to the plurality of focus positions by convolving the second image with the first PSF feature information according to the plurality of focus positions in a pixel basis.

7. The electronic device of claim 1,
wherein the instructions are further executable by the processor to cause the electronic device to:
select a first correction candidate image and a second correction candidate image corresponding to an identical focus position from among the first correction candidate image and the second correction candidate image, and
calculate the matching costs of pixels corresponding to each other based on pixel values of the pixels corresponding to each other between the first correction candidate image and the second correction candidate image selected.

8. The electronic device of claim 7,
wherein the instructions are further executable by the processor to cause the electronic device to:
identify a focus position where a difference between pixel values calculated for pixels is smallest, and
determine the depth map including pieces of depth information corresponding to the identified focus positions for the pixels.

9. The electronic device of claim 1,
wherein the first PSF feature information and the second PSF feature information are set to correspond to a plurality of aperture values respectively,
wherein the instructions are further executable by the processor to cause the electronic device to:
identify an aperture value when the first image and the second image are obtained, and
generate the first correction candidate images and the second correction candidate images based on the first PSF feature information and the second PSF feature information corresponding to the identified aperture value of the plurality of aperture values.

10. The electronic device of claim 1, further comprising:
a display,
wherein the instructions are further executable by the processor to cause the electronic device to:
apply an optical effect to at least one of the first image and the second image based on the depth map, and
display the at least one image to which the optical effect is applied on the display.

11. A method for determining a depth map in an electronic device comprising:
obtaining a first image by using first group pixels receiving a part of light that has passed through at least one lens, through a first optical path group and obtaining a second image by using second group pixels receiving another part of the light that has passed through the at least one lens, through a second optical path group;
obtaining first point spread function (PSF) feature information including a first asymmetric blur features and first image height-specific blur features of the first group pixels and second PSF feature information including a second asymmetric blur features and a second image height-specific blur features of the second group pixels with respect to a plurality of focus positions;
generating first correction candidate images based on the first image and the second PSF feature information and generating second correction candidate images based on the second image and the first PSF feature information;
calculating matching costs between a first region of interest (ROI) in a pixel basis of the first correction candidate image and a second ROI in the pixel basis of the second correction candidate image; and
determining a depth map corresponding to the matching costs between the first ROI and the second ROI.

12. The method of claim 11, wherein the first PSF feature information and the second PSF feature information are set to correct asymmetric blur features between the first group pixels and the second group pixels at the plurality of focus positions.

13. The method of claim 11,
wherein the first PSF feature information is set to correct a blur error for each image height for the first group pixels at the plurality of focus positions, and
wherein the second PSF feature information is set to correct a blur error for each image height for the second group pixels at the plurality of focus positions.

14. The method of claim 11, further comprising:
correcting a difference in signal magnitude for each image height between the first image and the second image using shading correction information,
wherein the generating of the first correction candidate image and the second correction candidate image includes generating the first correction candidate image based on the corrected first image and generating the second correction candidate image based on the corrected second image.

15. The method of claim 11, wherein the generating of the first correction candidate images and the second correction candidate images includes:
generating a number of first correction candidate images which is greater than a number of pieces of first PSF feature information based on the pieces of first PSF information for interpolating the pieces of first PSF feature information and the pieces of first PSF feature information, and
generating a number of second correction candidate image which is greater than a number of pieces of second PSF feature information based on the pieces of second PSF information for interpolating the pieces of second PSF feature information and the pieces of second PSF feature information.

16. The method of claim 11, wherein the generating of the first correction candidate images and the second correction candidate images includes:
generating the first correction candidate image corresponding to the plurality of focus positions by convolving the first image with the second PSF feature information according to the plurality of focus positions in a pixel basis, and
generating the second correction candidate image corresponding to the plurality of focus positions by convolving the second image with the first PSF feature information according to the plurality of focus positions in a pixel basis.

17. The method of claim 11, wherein the calculating the matching costs includes:
selecting a first correction candidate image and a second correction candidate image corresponding to an identical focus position from among the first correction candidate image and the second correction candidate image, and
calculating the matching costs of pixels corresponding to each other based on pixel values of the pixels corresponding to each other between the first correction candidate image and the second correction candidate image selected.

18. The method of claim 17, wherein the identifying the matching costs includes:
identifying a focus position where a difference between pixel values calculated for pixels is smallest, and
determining the depth map including pieces of depth information corresponding to the identified focus positions for the pixels.

19. The method of claim 11, wherein the generating of the first correction candidate image and the second correction candidate image includes:
identifying an aperture value when the first image and the second image are obtained, and
generating the first correction candidate image and the second correction candidate image based on the first PSF feature information and the second PSF feature information corresponding to the identified aperture value of a plurality of aperture values.

20. The method of claim 11, wherein the generating of the first correction candidate image and the second correction candidate image includes:
applying an optical effect to at least one of the first image and the second image based on the depth map, and
displaying the at least one image to which the optical effect is applied on the display.

* * * * *